United States Patent
Fountain, Jr.

(10) Patent No.: US 9,510,673 B2
(45) Date of Patent: Dec. 6, 2016

(54) POSITIONALLY RESTRAINED LAP-SUPPORTED DEVICES

(71) Applicant: Lonnie D. Fountain, Jr., Biloxi, MS (US)

(72) Inventor: Lonnie D. Fountain, Jr., Biloxi, MS (US)

( * ) Notice: Subject to any disclaimer, the term of this patent is extended or adjusted under 35 U.S.C. 154(b) by 0 days.

(21) Appl. No.: 14/631,141

(22) Filed: Feb. 25, 2015

(65) Prior Publication Data

US 2015/0305492 A1 Oct. 29, 2015

Related U.S. Application Data

(60) Provisional application No. 61/984,197, filed on Apr. 25, 2014.

(51) Int. Cl.
*A47B 23/00* (2006.01)
*F16B 2/10* (2006.01)
*F16B 2/12* (2006.01)

(52) U.S. Cl.
CPC ............... *A47B 23/002* (2013.01); *F16B 2/10* (2013.01); *F16B 2/12* (2013.01)

(58) Field of Classification Search
CPC . A47B 23/002; A47B 23/001; A47G 23/0608; F16B 2/10; F16B 2/12
USPC ...... 108/43, 44, 42, 90; 211/86.01; 297/135, 297/148
See application file for complete search history.

(56) References Cited

U.S. PATENT DOCUMENTS

| | | | | |
|---|---|---|---|---|
| 527,108 A * | 10/1894 | Cooper | | 108/43 |
| 2,663,603 A * | 12/1953 | Newman | | 108/43 |
| 2,697,018 A * | 12/1954 | Georgides | | 108/43 |
| 2,770,514 A * | 11/1956 | Idso | | 108/43 |
| 2,787,507 A * | 4/1957 | Powers | | 108/43 |
| 2,844,429 A * | 7/1958 | Frey | | 108/43 |
| 3,185,113 A * | 5/1965 | Nathan et al. | | 108/43 |
| 3,709,158 A * | 1/1973 | Kidd | | 108/43 |
| 3,915,102 A | 10/1975 | Barron | | |
| 4,311,099 A * | 1/1982 | Roberts | | 108/43 |
| 4,566,732 A | 1/1986 | Ostergaard, II et al. | | |
| 4,779,884 A | 10/1988 | Minati | | |
| 5,368,266 A * | 11/1994 | Allen | | 108/47 |
| 5,909,922 A * | 6/1999 | Dugas | | 108/43 |
| 6,082,270 A * | 7/2000 | Zerger | | 108/44 |
| 6,496,360 B1 | 12/2002 | Cordes et al. | | |
| 7,216,929 B2 | 5/2007 | Lang et al. | | |
| 7,621,499 B2 * | 11/2009 | Hovsepian et al. | | 108/43 |

* cited by examiner

*Primary Examiner* — Jose V Chen
(74) *Attorney, Agent, or Firm* — Nixon & Vanderhye P.C.

(57) ABSTRACT

Lap-supported devices are provided which are especially adapted for use by seated individuals, and include a base member, an opposed pair of clamp arms extending outwardly from a bottom surface of the base member and spaced apart from one another so as to accommodate therebetween a lap region of an individual, and a biasing assembly which exerts a bias force onto each of the clamp arms and thereby provide a clamping force against the respective lateral thigh regions of an individual. Some embodiments will have pivotal clamp members which include a torosional spring assembly to provide clamping force against the individual's lateral thigh regions. Alternatively or additionally, other embodiments may be provided with slide plates which carry the clamp arms and a tension spring assembly operatively connected to the slide plates.

39 Claims, 13 Drawing Sheets

POSITIONALLY RESTRAINED LAP-SUPPORTED DEVICES

CROSS-REFERENCE TO RELATED APPLICATION

This application is based on and claims domestic priority benefits under 35 USC §119(e) from U.S. Provisional Application Ser. No. 61/984,197 filed on Apr. 25, 2014, the entire content of which is expressly incorporated hereinto by reference.

FIELD

The embodiments disclosed herein relate generally to positionally restrained lap-supported devices, such as lap-supported tables, trays, baskets, cases and the like.

BACKGROUND

Many individuals have a need to support objects on their laps for a variety of reasons. For example, during long distance transportation an individual may have a need to support writing papers, electronic devices (e.g., personal computers, game devices, electronic tablets and the like), food and/or beverages while seated.

By way of another specific example, paraplegic individuals have a continual need to carry items while manipulating their wheelchair. There are numerous instances in daily life that a paraplegic individual will have a need to support items on their lap while moving their wheelchair. For example, when in a self-serve restaurant, it is necessary for the individual to support a tray laden with food and/or beverages on their lap so the individual can move their wheelchair to a dining table. The paraplegic individual of course is physically incapable of sensing the weight of the tray against their lap and/or any movement of the tray items, especially items that may not inherently be stable (e.g., cups filled with a liquid beverage). During manipulation of the individual's wheelchair, such an inability to physically sense the presence of the tray and/or movement of the items supported on the tray can result in tray slippage and/or spillage.

The art is replete with proposals to address the needs of paraplegic individuals as evidenced by U.S. Pat. Nos. 3,915, 102, 4,779,884, 4,566,732 and 7,216,929, the entire contents of each being expressly incorporated hereinto be reference. Such prior proposals, however, necessarily require the table to be physically attached to a structural component of the individual's wheelchair or supported directly by the ground.

What has been needed in this art, therefore, are lap-supported devices, such as lap-supported tables, trays, baskets, cases and the like, that may positionally be restrained relative to an individual's lap to thereby ensure hands-free support of items. It is towards providing such a need that the embodiments of the present invention are directed.

SUMMARY

In general, the embodiments disclosed herein are directed toward lap-supported devices that can be used by virtually any individual while in a seated position, for example, individuals seated during long-distance transportation, drive-in dining experiences, and the like. Since the lap-supported devices of this invention are positionally restrained, they may reliably be used by individuals to assist in a variety of events during daily life.

Certain embodiments of the lap-supported devices according to the invention will include a base member, an opposed pair of clamp arms extending outwardly from a bottom surface of the base member and spaced apart from one another so as to accommodate therebetween a lap region of an individual such that each of the clamp arms is adjacently positioned against a respective lateral thigh region of the individual; and a biasing assembly which exerts a bias force onto each of the clamp arms to move the clamp arms in a direction to provide a clamping force against the respective lateral thigh region of the individual.

Some embodiments may be provided with clamp arms that are pivotally connected to the base member so as to be capable of pivotal movements between a retracted state whereby the clamp arms are positioned adjacent to the base member and an extended state whereby the clamp arms extend outwardly from the base member. In such embodiments, the biasing assembly comprises torosional hinge springs operatively connected to the clamp arms to exert a bias force to move the clamp arms in a direction of the retracted state thereof. A pair of hinge mechanisms may therefore pivotally connect each of the clamp arms to a respective lateral side region of the base member. The hinge mechanisms may include spaced-apart pairs of apertured flanges fixed to the base member, spaced apart apertured posts fixed to each of the clamp arms and coaxially aligned with the flanges, and a hinge pin joining the coaxially aligned apertured flanges and posts. The biasing spring may therefore be in the form of a torosional hinge spring which is coaxially carried by the hinge pin.

Alternatively or additionally, the clamp arms may be laterally moveable relative to one another to define greater and lesser separation distances therebetween. In such embodiments, the biasing assembly may comprise a tension spring assembly which biases the clamp arms toward one another in a direction that establishes a lesser separation distance therebetween, whereby a clamping force is exerted against the respective lateral thigh region of the individual.

According to certain other embodiments, therefore, a pair of opposed slide plates may be connected to the base member for reciprocal sliding movements between retracted and extended positions thereof. The tension spring assembly may thus operatively connect the slide plates for exerting a bias force to move the slide plates in a direction toward the retracted position thereof. As such, the clamp arms are connected to a respective one of the slide plates so that the bias force of the tension spring assembly causes the clamp arms to be moved in a direction towards one another.

Certain embodiments will include a post extending outwardly from the bottom surface thereof, and a tension spring assembly which comprises a pair of tension springs each having one end connected to a respective one of the slide plates and an opposite end connected to the post. Each of the slide plates may therefore include a U-shaped channel to accommodate a respective one of the tension springs. The base member may therefore comprise a pair of parallel slide rails for receiving a respective edge of the slide plates to allow for reciprocal sliding movements thereof. A stop may be provided with projecting bosses extending from the slide plates which abut against a respective end of the slide rails to establish the retracted positions thereof. A cover member may be provided to cover the tension spring assembly, in which case the cover member can be connected removably to the slide rails by respective connection flanges.

One preferred embodiment of a lap-supported device will include a base member, an opposed pair of clamp arms, and a pair of spring-biased hinge mechanisms each pivotally connecting a respective one of the clamp arms to a respective side edge region of the base member. The hinge mechanisms will exert a bias force to maintain the clamp arms in a retracted state whereby the clamp arms are positioned adjacent to the base member but allow for pivotal spreading movement of the clamp arms against the bias force to an extended state thereof. In such a manner, therefore, the clamp arms are spread sufficiently to accommodate an individual's lap so as to be capable of being positioned adjacent to the individual's lateral thigh region, the bias force causing the clamp arms to exert a clamping force against the individual's lateral thigh region so as to positionally maintain the table assembly on the individual's lap.

Another preferred embodiment of a lap-supported device will comprise a base member, a pair of opposed slide plates connected to the base member for reciprocal sliding movements between retracted and extended positions thereof, and a pair of clamp arms extending outwardly from the base member and connected to a respective one of the slide plates so as to be carried by the slide plates during movements between the retracted and extended positions thereof. A tension spring assembly operatively connects the slide plates for exerting a bias force to move the slide plates in a direction toward the retracted position thereof so that the clamp arms are moved toward one another in a direction that establishes a lesser separation distance therebetween to thereby exert a clamping force against a respective lateral thigh region of the individual.

Various modifications can be made to the structural components of the lap table assemblies. For example, the base member may define a substantially planar top surface to thereby function as a support table. The top surface of the base member may be recessed so as to define a perimetrical lip, e.g., so the base member can function as an integral tray. Various other devices can be physically attached to or be integrally formed with the base member, such as baskets, cases (e.g., for lap-top computers), or the like. Each of the clamp arms advantageously may be convexly curved so as to generally conform to the respective lateral thigh region of the individual. In order to assist the application of a spreading force to the clamp arms (i.e., so as to move the clamp arms from the retracted state and into an extended state during use), each clamp arm may include an elongate hand hole.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
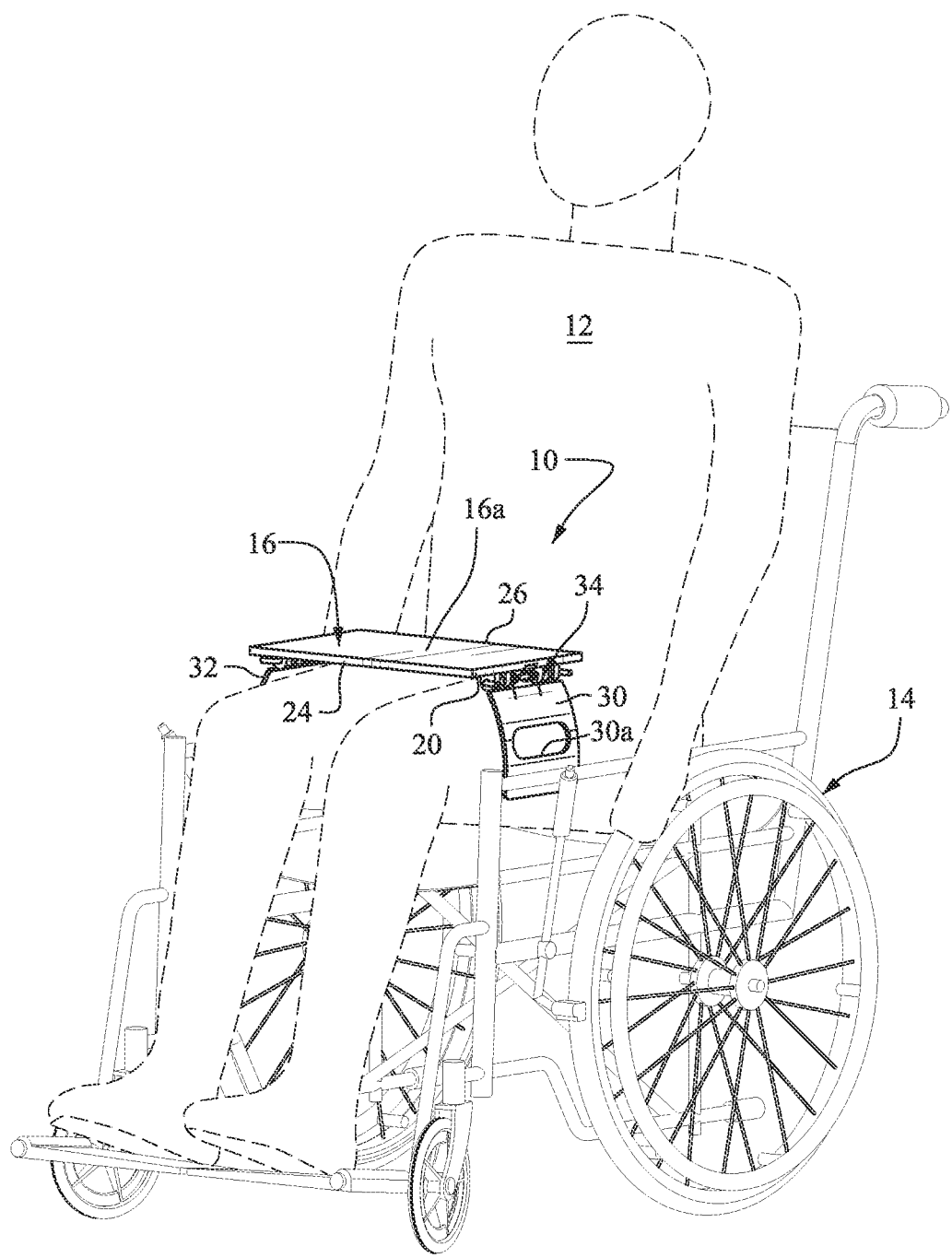
FIG. 1 is an environmental perspective view of a lap-supported device in accordance with an embodiment of the invention.

Accompanying FIG. 1 depicts a lap-supported device 10 in accordance with an embodiment of the invention in an environment of potential use, e.g., as a lap table for a paraplegic individual 12 in a wheelchair 14. However, as briefly noted above, the device 10 may be employed by any individual while seated. As is shown, the lap-supported device 10 is positioned on and is of sufficient lateral dimension to extend substantially across the upper thigh region of the individual 12.

As is perhaps better shown in the enlarged views of FIGS. 2-7, the lap-supported device 10 is generally comprised of a base member 16 which defines top and bottom surfaces 16a, 16b, respectively. According to the depicted embodiment, the top surface 16a is planar to thereby function as a table surface to allow for placement of objects thereon. However, the top surface may be recessed somewhat to form a tray-like structure having a perimetrical lip to assist in maintaining objects thereon. Alternatively, the base member 16 may be physically attached to or be integrally formed with a variety of contrivances, such as baskets, cases (e.g., for lap-top computers) or the like. The bottom surface 16b may be substantially planar as shown or may define a laterally adjacent pair of concavities which generally conform to the convex curvatures of the respective upper thigh regions of the individual 12.

According to the embodiment depicted in FIGS. 2-7, the base member 16 is generally rectangular and includes an opposed pair of lateral edge regions 20, 22 define therebetween the effective lateral dimension of the assembly 10. As noted briefly above, the lateral dimension is selected so as to extend substantially (if not entirely) across the lap region of the individual 12 when seated, e.g. in the wheelchair 14. The base member 16 also includes forward and rearward edge regions, 24, 26, respectively, with define therebetween the effective widthwise dimension of the assembly 10. The widthwise dimension is not critical but should be sufficient so as to comfortably be received in an area defined by the upper thighs and knees of the individual 12.

Figure 2:
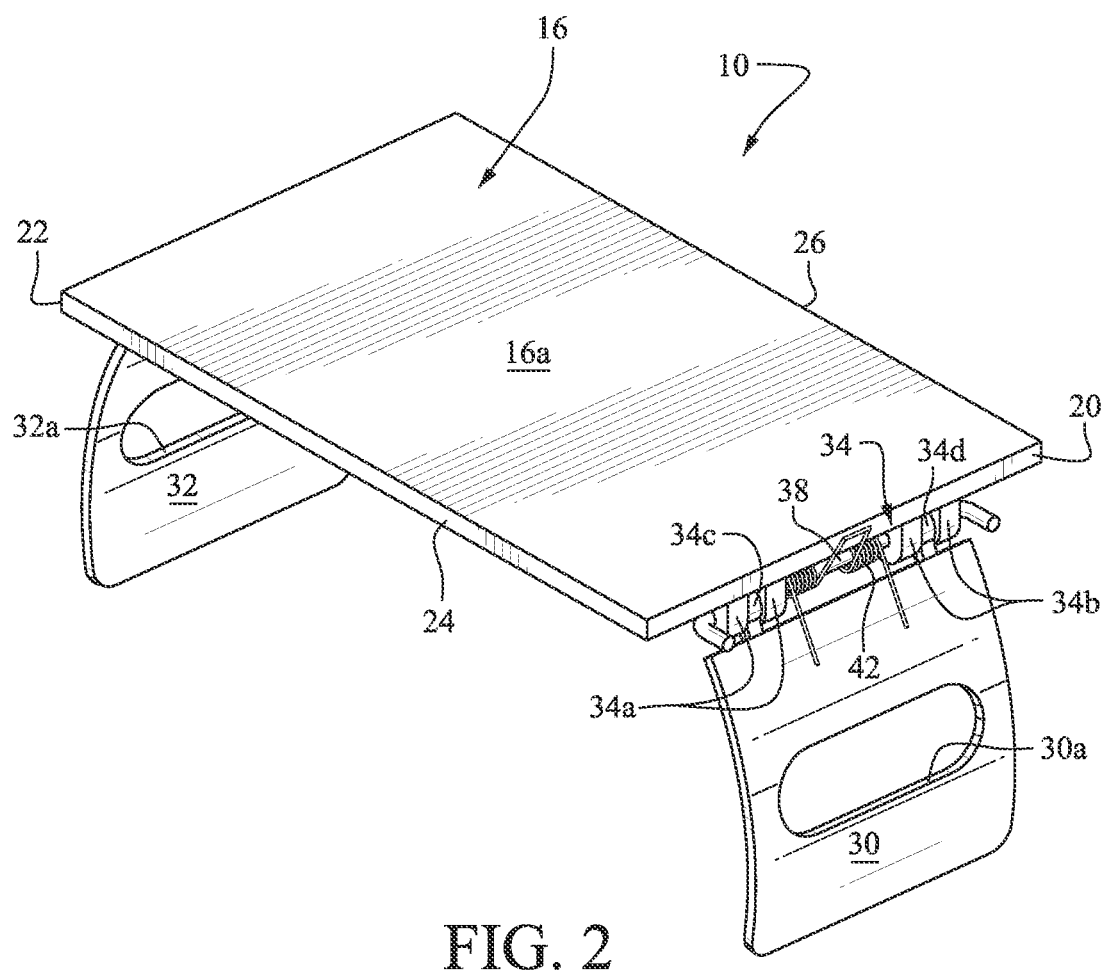
FIG. 2 is an enlarged top front perspective view of the lap-supported device shown with the clamp arms in an extended state.
Figure 3:
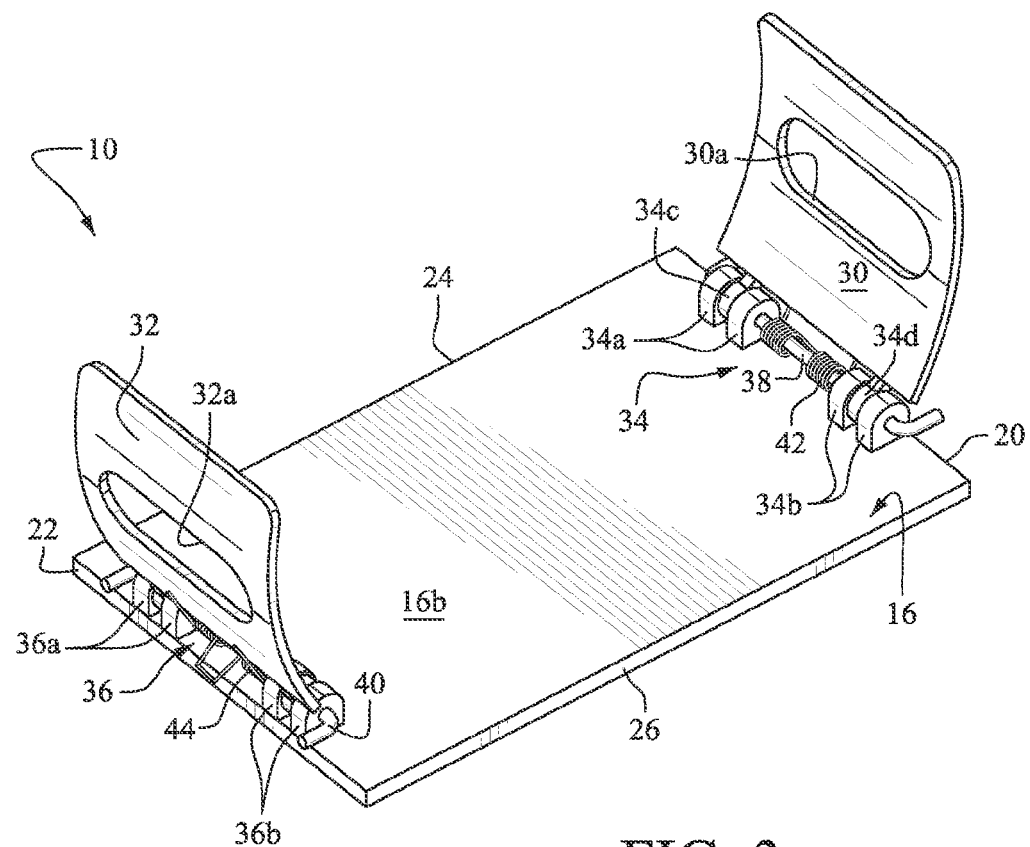
FIG. 3 is a bottom perspective view of the lap-supported device shown with the clamp arms in an extended state.
Figure 4:
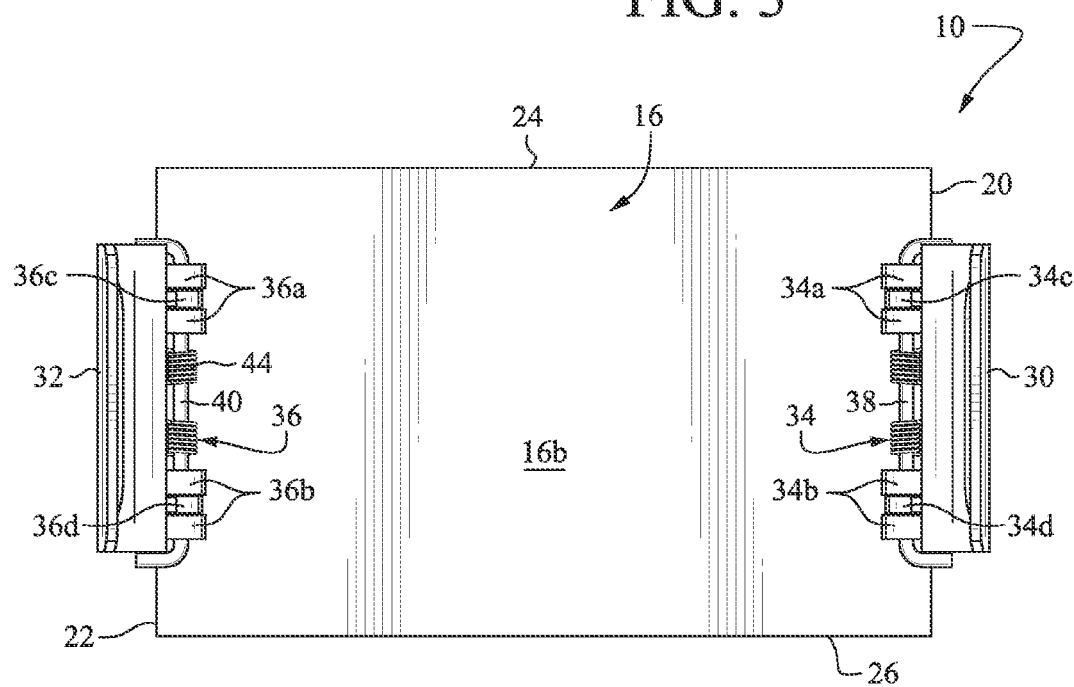
FIG. 4 is a bottom plan view of the lap-supported device shown with the clamp arms in an extended state.
Figure 5:
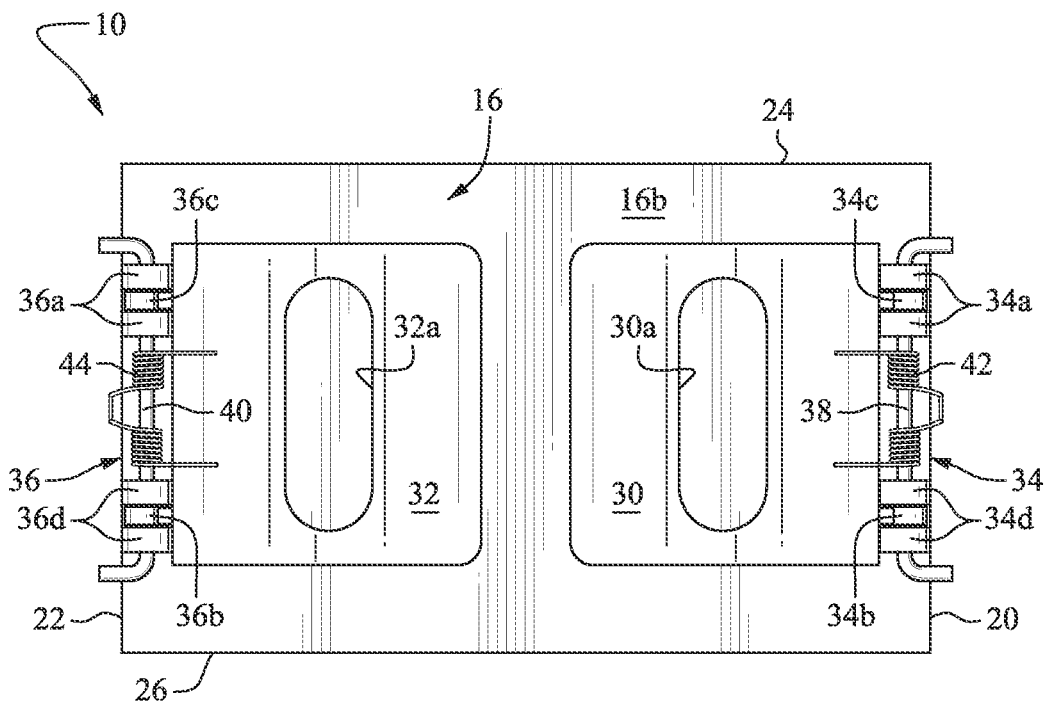
FIG. 5 is a bottom plan view of the lap-supported device similar to FIG. 4 but shown with the clamp arms in a retracted state.
Figure 6:
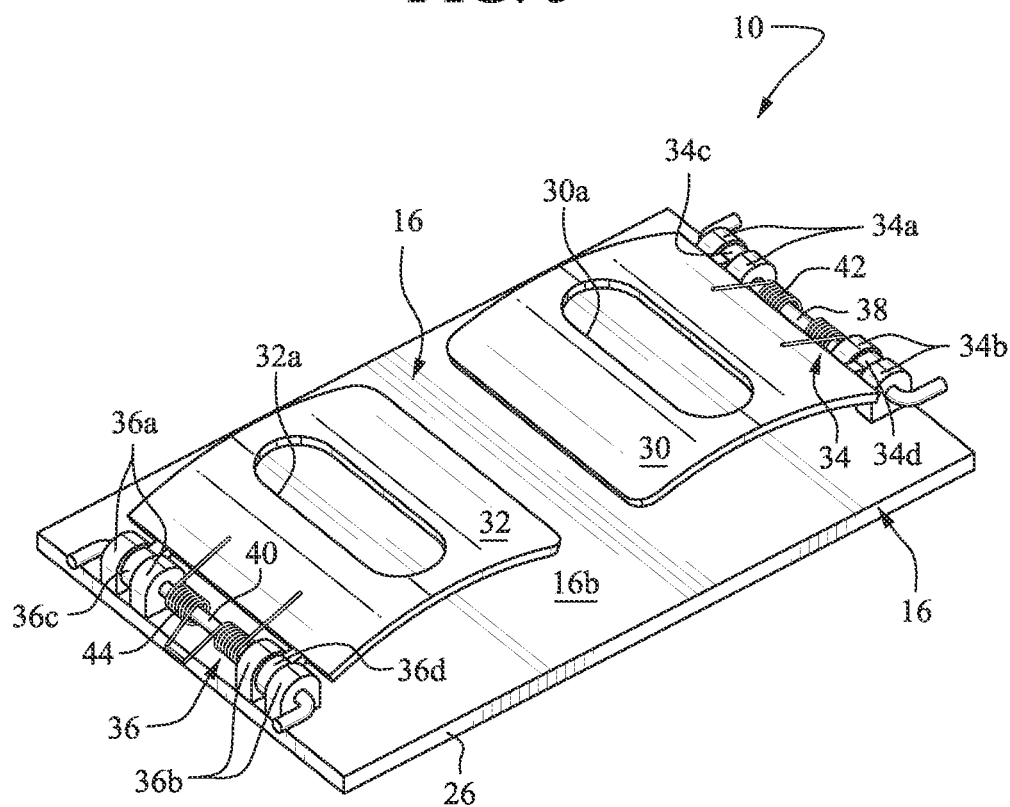
FIG. 6 is a bottom perspective view of the lap-supported device similar to FIG. 3 but shown with the clamp arms in a retracted state.
Figure 7:
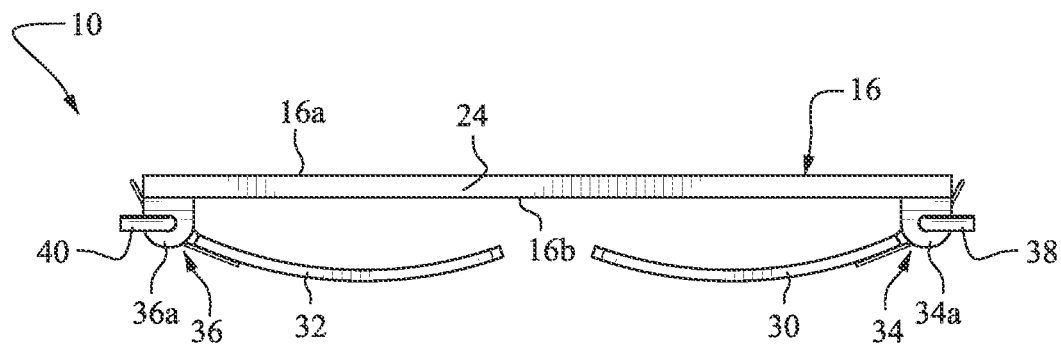
FIG. 7 is a side elevational view of the lap-supported device shown with the clamp arms in a retracted state.
Figure 8:
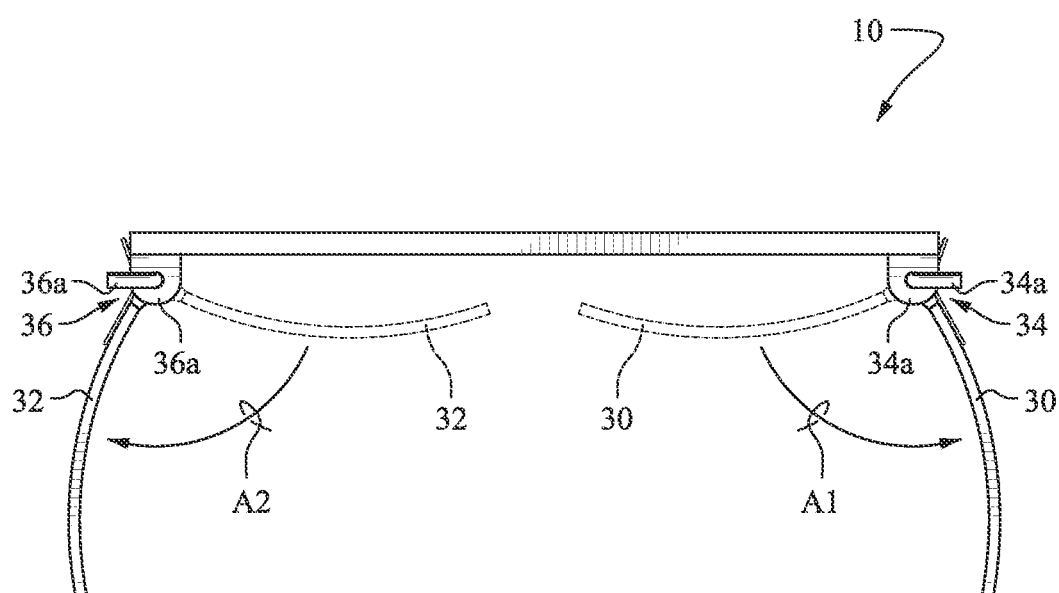
FIG. 8 is a side elevational view of the lap-supported device shown with the clamp arms in an extended state.

Positional restraint of the lap-supported device 10 is provided by an opposed pair of clamp arms 30, 32. According to the depicted embodiment, the clamp arms 30, 32 are connected operably to the side edge regions 20, 22 by spring-biased hinge mechanisms 34, 36, respectively, so as to be capable of pivotal movement against the bias force (i.e., in the direction of arrows A1 and A2 shown in FIG. 8) from a retracted (normal) state as shown in FIGS. 5-7 into an extended (operable) state as shown in FIGS. 2-4. More specifically, in the depicted embodiment each of the hinge mechanisms 34, 36 will include apertured pairs of flanges 34a, 34b and 36a, 36b rigidly formed and extending from the bottom surface 16b. The flanges 34a, 34b and 36a, 36b cooperatively receive a respective one of the apertured posts 34c, 34d and 36c, 36d extending from a proximal edge of the clamp arms 30, 32, respectively, in a coaxially aligned relationship.

A hinge pin 38, 40 is inserted coaxially through and pivotally joins the flanges 34a, 34b and 36a, 36b and posts 34c, 34d and 36c, 36d, respectively. Each of the hinge pins 38, 40 coaxially carries a torsion hinge spring 42, 44, respectively, having one end engaged with one of the side regions 20, 22 of the base member and another end engaged with a proximal end of the clamp arms 30, 32. The hinge springs 42, 44 thereby exert a bias force against the clamp arms 30, 32 which in turn pivotally biases each arm 30, 32 into a retracted state whereby the arms 30, 32 are maintained in a position whereby they are folded against and positioned adjacent to the bottom surface 16b of the base member 16 (e.g., as shown in FIGS. 5-7). The hinge mechanisms 34, 36 therefore allow each the clamp arms 30, 32 to be pivotally spread against the bias force of the hinge springs 42, 44 in the direction of arrows A1, A2, respectively, from their retracted state (i.e., as shown in dashed line in FIG. 8) and into an extended state (as shown by solid line in FIG. 8) whereby the clamp arms 30, 32 extend downwardly and outwardly from the base member 16.

While in the extended state, the individual 12 may place the clamp arms 30, 32 so each is positioned adjacent a respective lateral thigh region of the individual 12. Releasing the spreading force will therefore allow the clamp arms 30, 32 to move pivotally toward their retracted state (i.e., in directions opposite to arrows A1 and A2, respectively) by virtue of the biasing force provided by way of the hinge springs 42, 44. In such a manner, therefore, a modestly sufficient clamping force will be exerted by each of the clamp arms 30, 32 against the lateral thigh region of the individual 12 thereby maintaining the table assembly 10 securely on the individual's lap region. The amount of the clamping force can of course be selected by those skilled in the art in dependence upon the particular force of the springs 42, 44 that are employed.

Elongated hand holes 30a, 32a may be formed in each of the clamp arms 30, 32, respectively, to facility the individual 12 applying a spreading force thereto against the bias force of the hinge springs 42, 44. The clamp arms 30, 32 may also be somewhat convexly curved so as to generally conform to the convex curvature of the lateral thigh regions of the individual 12 when the assembly 10 is placed in use (e.g., as shown in FIG. 1).

Figure 9:
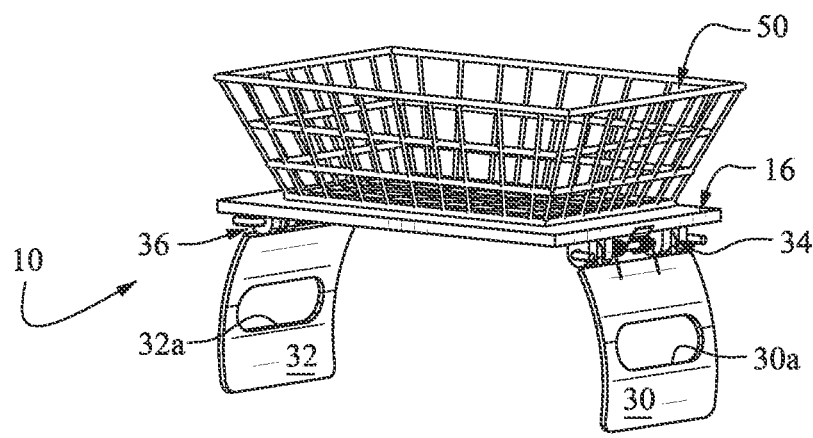
FIGS. 9-11 depict exemplary items that may be supported by the lap-supported device during use.
Figure 10:
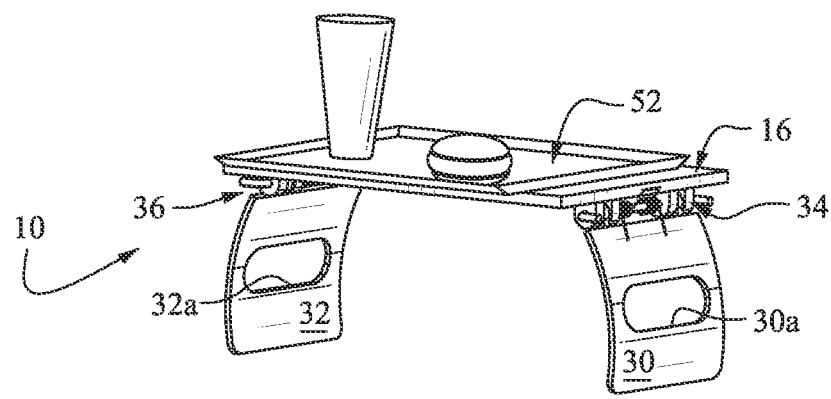
Figure 11:
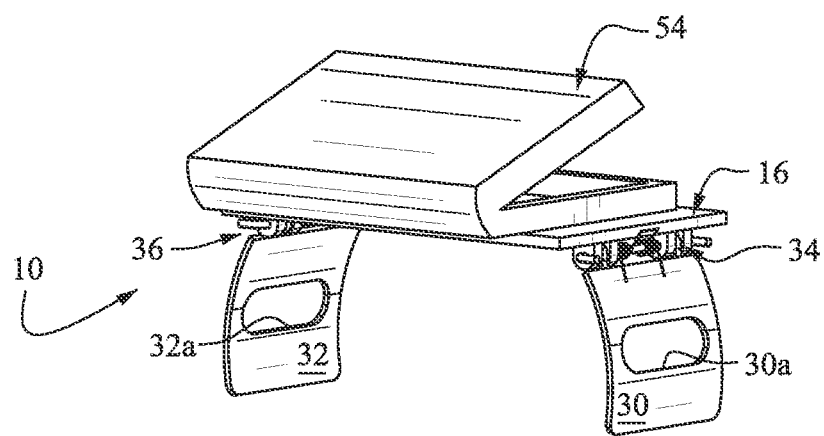

FIGS. 9-11 show various alternative embodiments and uses for the lap-supported device 10. For example as shown in FIG. 9, the lap-supported device 10 may be used to support a basket 50. FIG. 10 depicts a restaurant tray 52 being supported by the base member 16, but as noted above the base member 16 could be configured to be an integral tray for such purpose. FIG. 11 shows a brief case 54 for a lap top computer or the like. Each of the items 50, 52 and 54 as shown in FIGS. 9-11 may or may not be physically attached to the base member 16 (e.g., by means of Velcro® brand fabric fasteners, clamps, hooks or the like) as may be desired by the individual 12. Alternatively, the base member 16 may be integrally formed with each of the items 50, 52 and 54.

It is also conceivable that the base member 16 and the clamp arms 30, 32 could be formed as a generally one piece structure relative to one another (e.g., via injection molding of thermoplastic material) whereby the spring biasing provided to the clamp arms 30, 32 is established by an integral hinge. Furthermore, the biasing force could be provided by way of an elastomeric hinge strip that may be ultrasonically welded or otherwise affixed (e.g., by adhesive, screws of the like) to the adjoining edges of the clamp arms 30, 32 and the base member 16. Suffice it to say that those skilled in the art will be capable of providing a biasing force to the clamp arms 30, 32 by means that are equivalent to the structures that have been described above.

Figure 12:
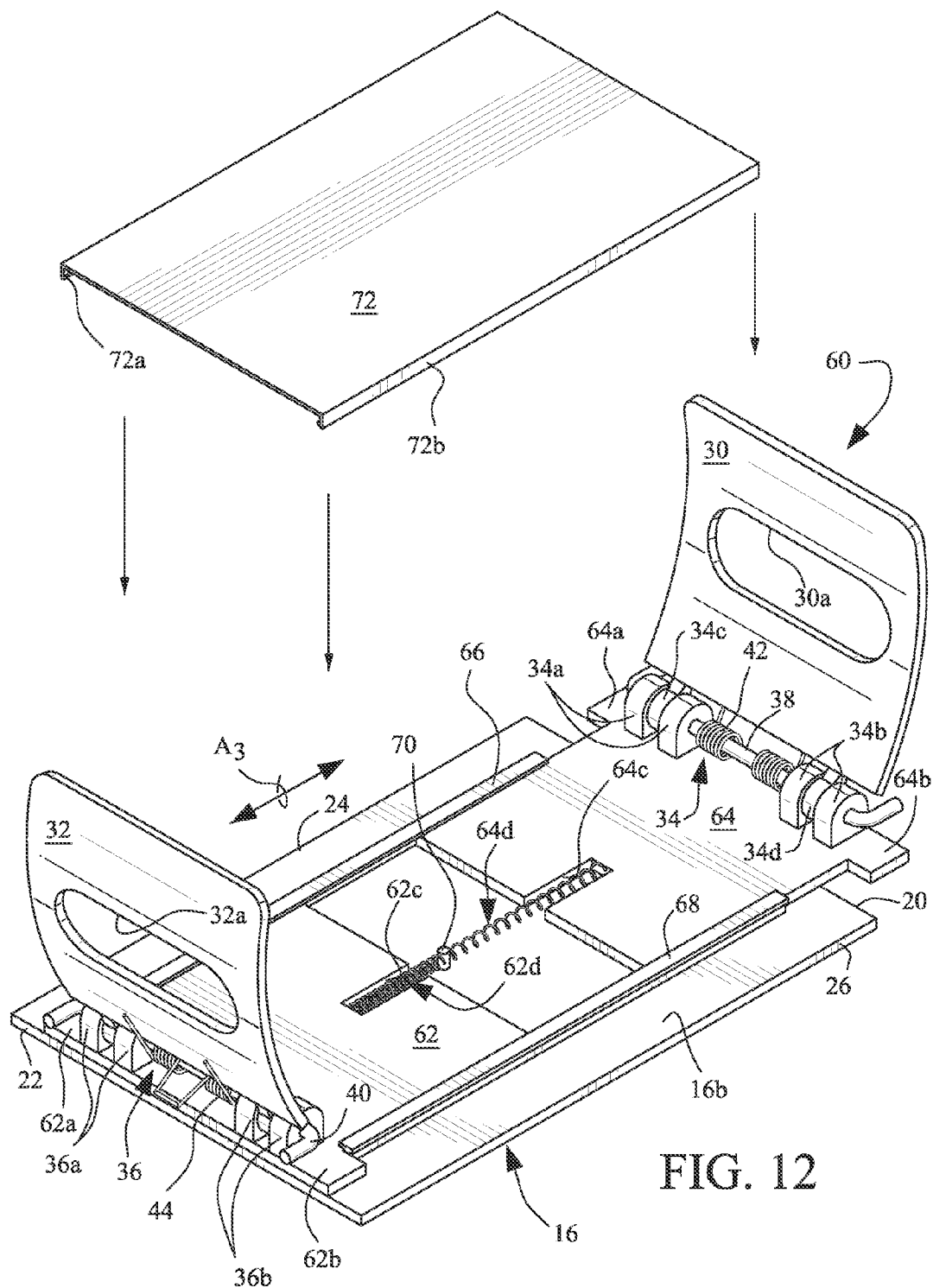
FIG. 12 is a bottom perspective view, partially disassembled, of another embodiment of the lap table according to the present invention.

Accompanying FIGS. 11 and 12 depict another embodiment of a lap table 60 according to the present invention which is similar to the lap-supported device 10 as described above in that lateral compressive force may be applied to a user's lateral thigh regions to allow the lap-supported device to be positionally maintained without fear of slippage. According to the embodiment shown in FIGS. 11 and 12, however, the lap-supported device 60 is provided with opposed slide plates 62, 64 having respective edges that are cooperatively received by a parallel set of slide rails 66, 68 fixed to the bottom surface 16b of base member 16 so as to permit reciprocal sliding movement of each slide plates 62, 64 (arrow A3 in FIG. 12) relative to the base member 16 between a fully retracted position (as shown by the position of slide plate 62 in FIG. 12) and an extended position (as shown by the position of the slide plate 64 in FIG. 12). In such a manner, therefore, the distance between the clamp arms 30, 32 may be varied between lesser and greater extents, respectively.

Each of the slide plates 62, 64 is formed with oppositely projecting bosses 62a, 62b and 64a, 64b which abut against respective ends of the slide rails 66, 68 when the slide plates 62, 64 are in a fully retracted position but are spaced from the ends of the slide rails 66, 68 when the slide plates 62, 64 are in an extended position. The bosses 62a, 62b and 64a, 64b thereby provide a stop when abutted against the ends of the slide rails 62, 64 so as to establish the fully retracted position of the slide rails 66, 68.

Figure 13:
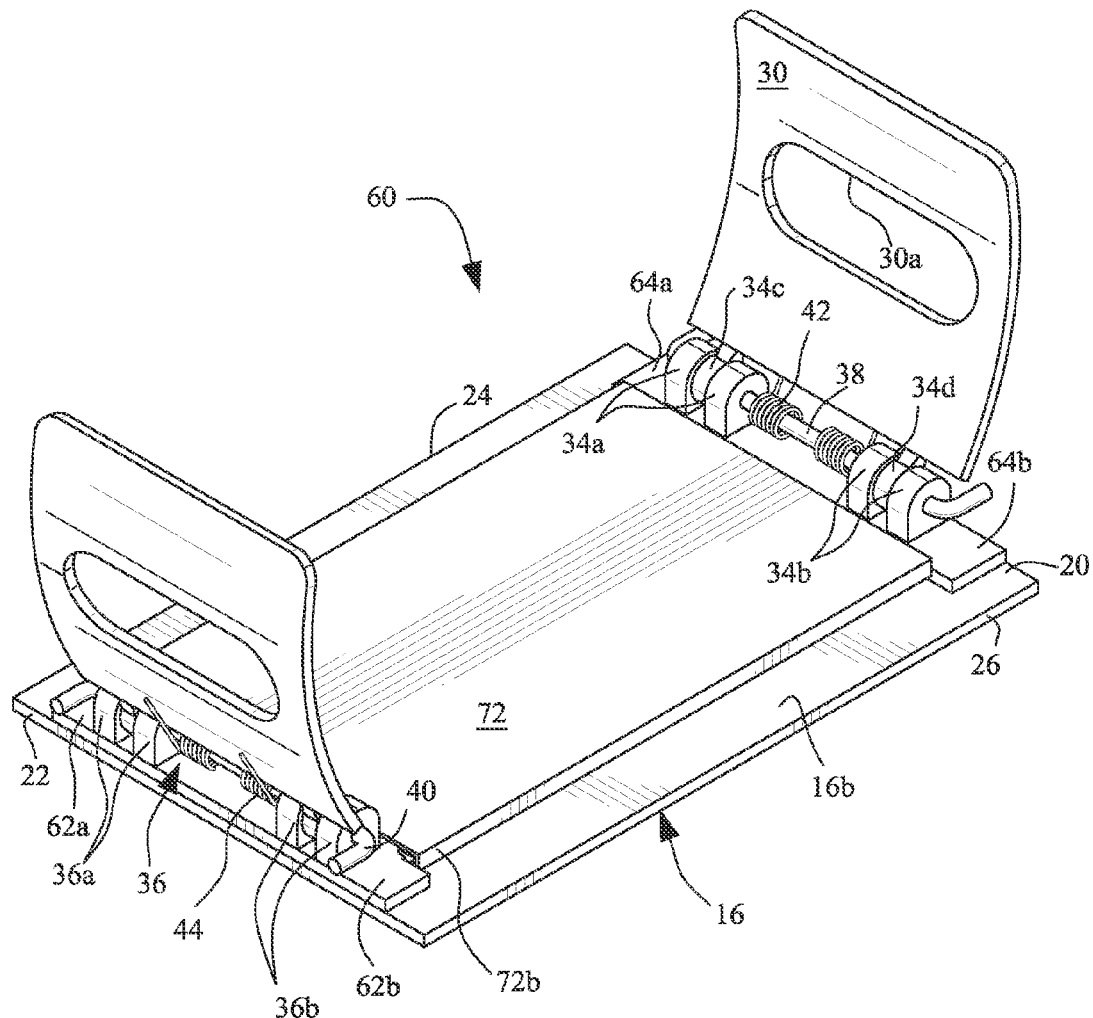
FIG. 13 is a bottom perspective view of the lap table depicted in FIG. 11 in a fully assembled state.
Figure 14:
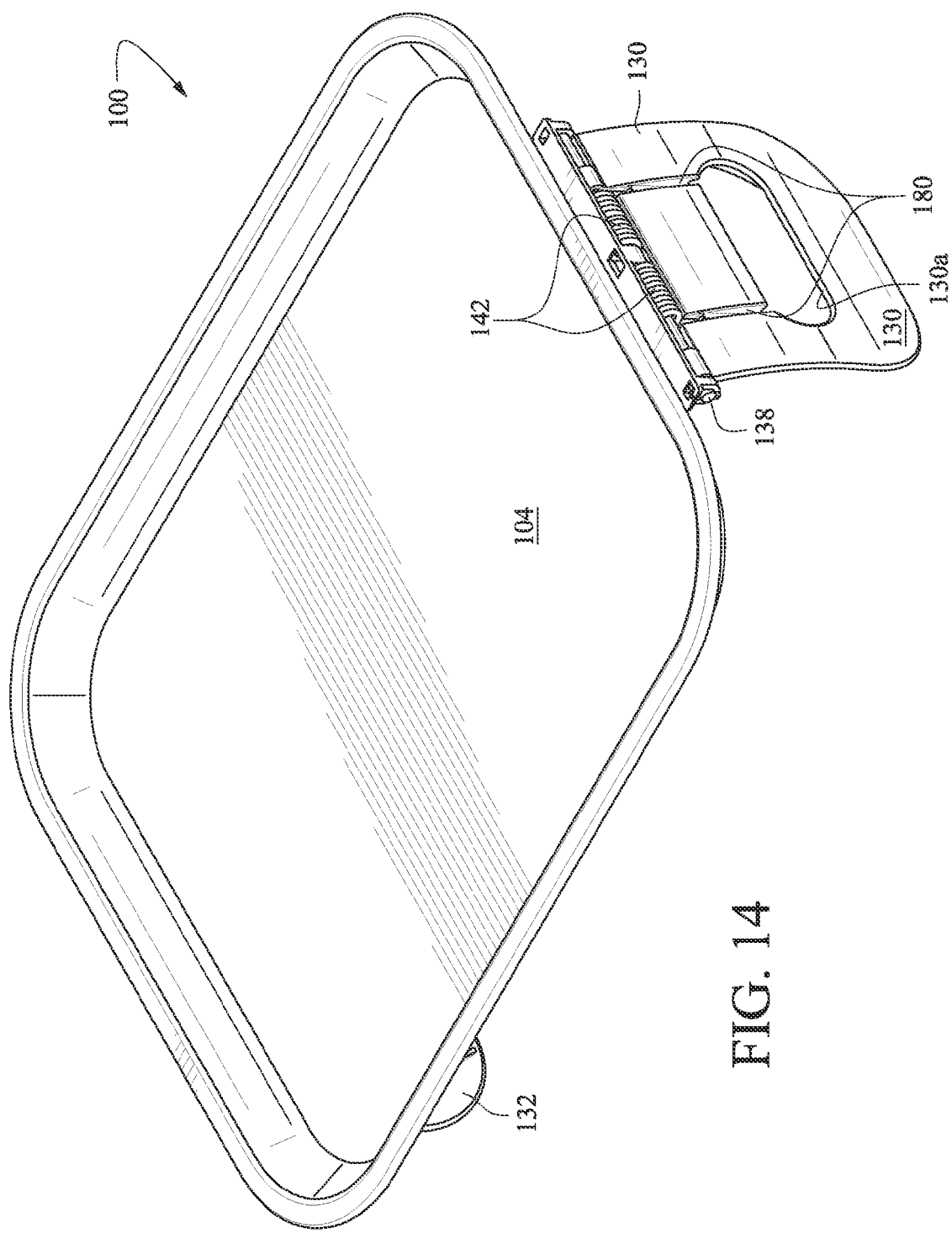
FIG. 14 is a top perspective view of a lap-supported device in accordance with another embodiment of the invention.
Figure 15:
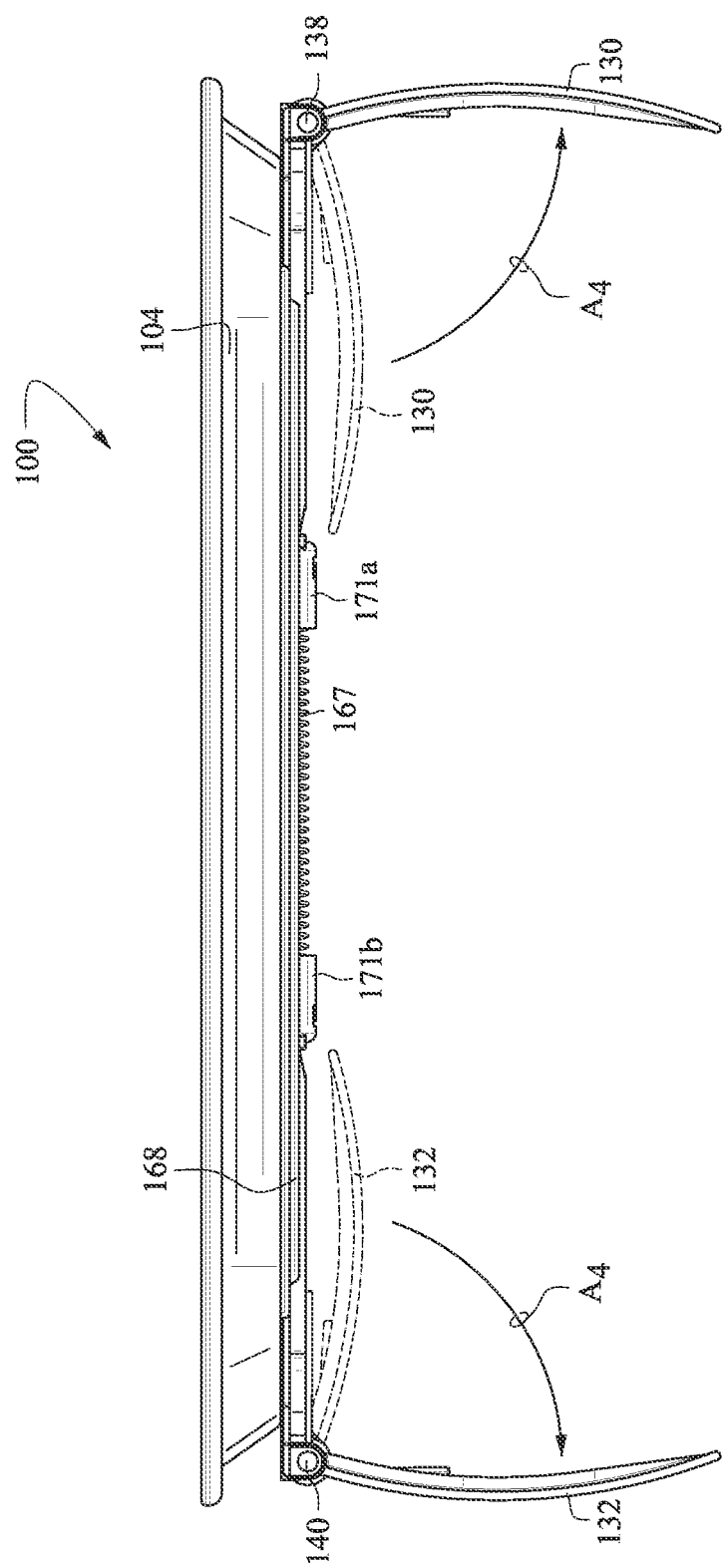
FIG. 15 is a front elevational views of the device depicted in FIG. 14, the rear elevational view being substantially a mirror image thereof.
Figure 16:
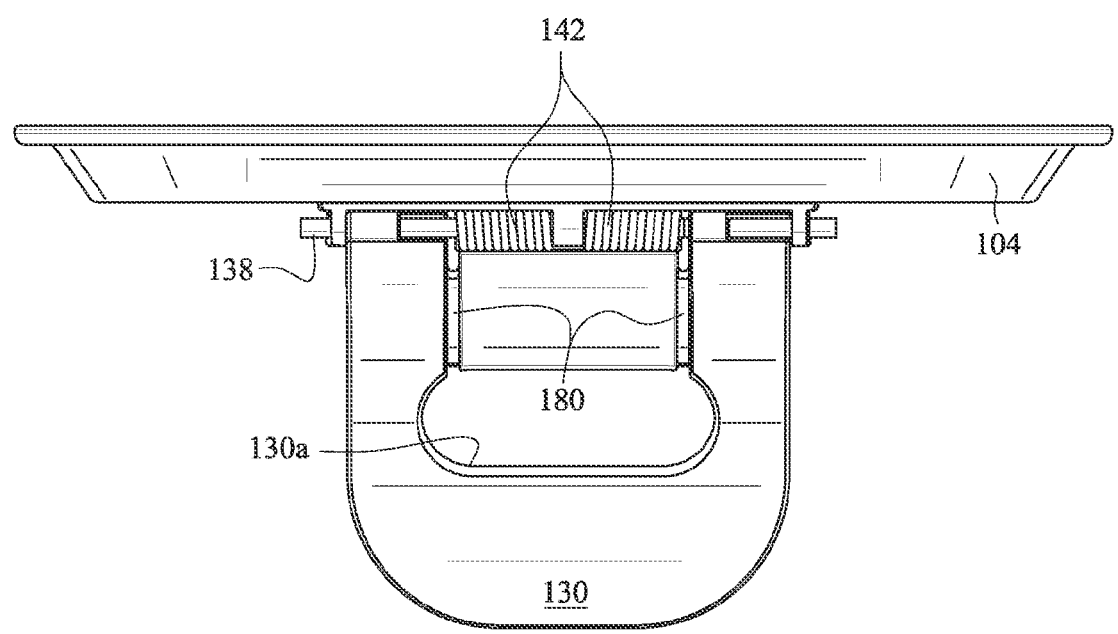
FIG. 16 is a bottom plan view, respectively, of the device depicted in FIG. 14.
Figure 17:
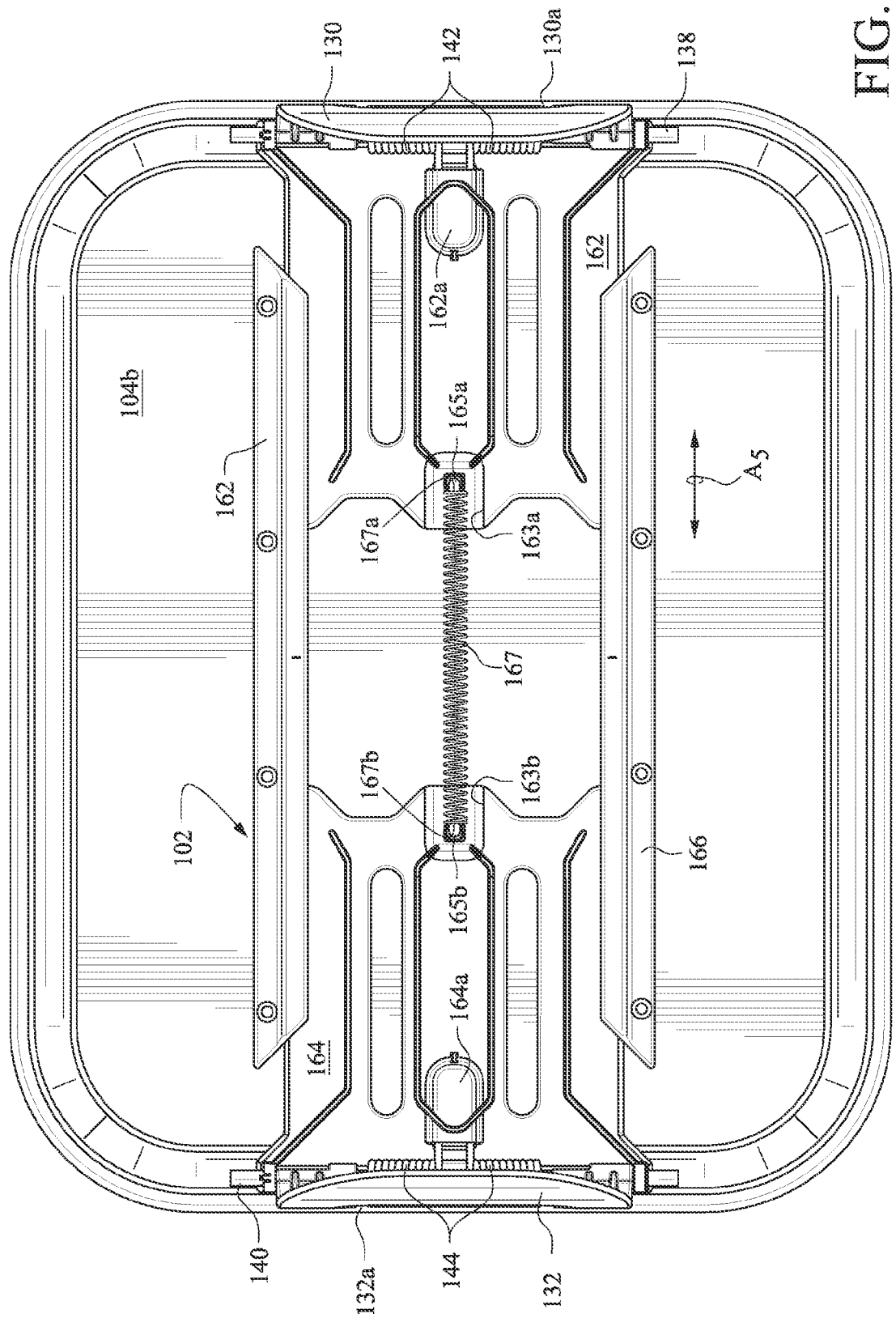
FIG. 17 is a right side elevational view of the device depicted in FIG. 14, the left side elevational view being substantially a mirror image thereof.
Figure 18:
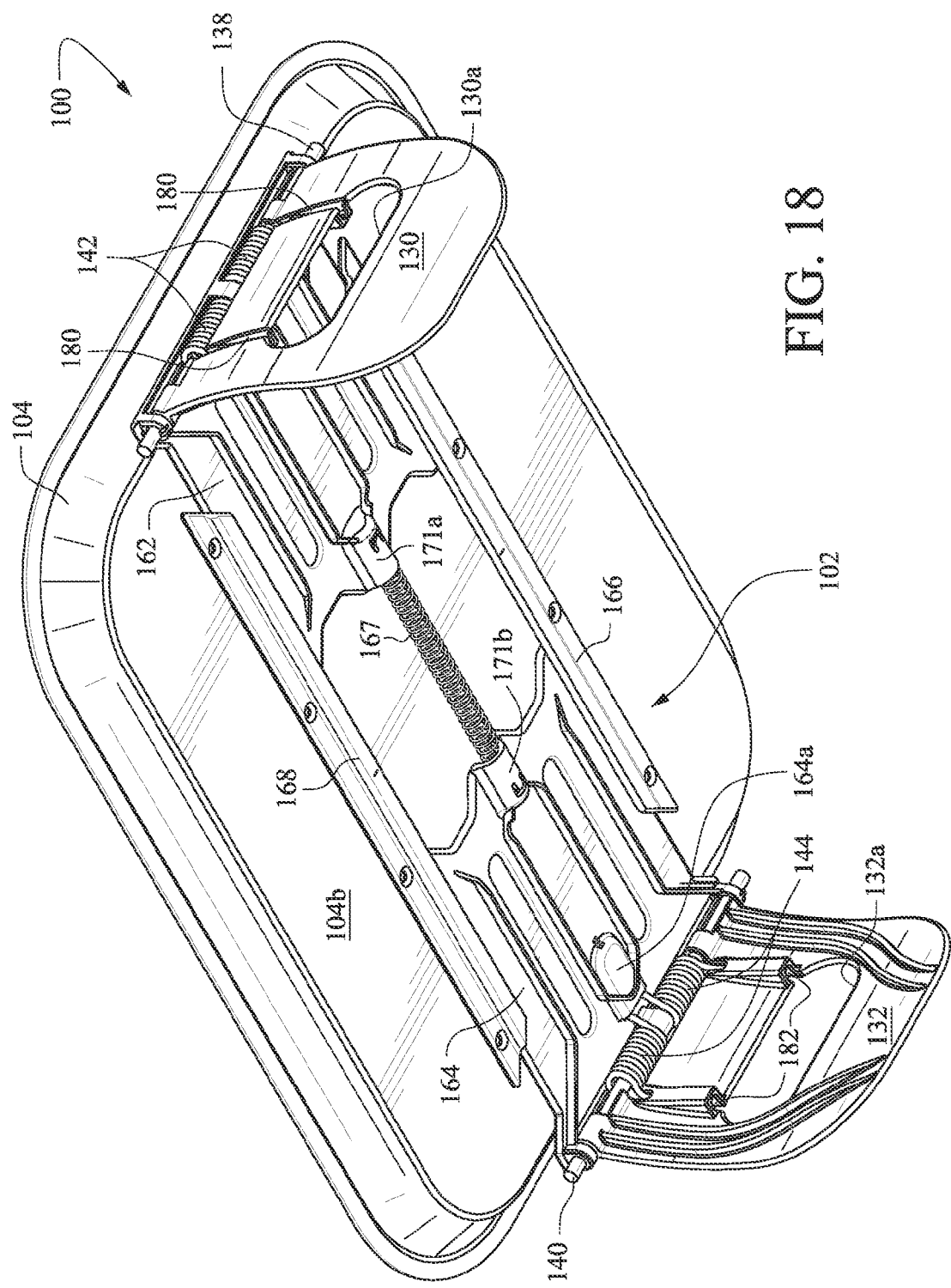
FIG. 18 is a bottom perspective view of the device depicted in FIG. 14.

The slide plates 62, 64 are provided with respective opposed U-shaped channels 62c, 64c which receive a lengthwise extent of a tension spring 62d, 64d. Each of the tension springs 62d, 64d has one end connected to the respective slide plate 62, 64 at the distal end of the channels 62c, 64c and an opposite end connected to a common center post 70. As is shown in FIG. 13, a cover member 72 formed, for example, of a sheet of thermoplastic material, may be provided with opposed connection flanges 72a, 72b which engage with a respective one of the slide rails 66, 68, respectively, so as to cover the springs 62c, 64d and center post 70.

In use, slidably moving either or both of the slide plates 62, 64 from a retracted position to an extended position will responsively cause the springs 62d, 64d to be loaded with a biasing force that will tend to reciprocally pull the plates 62, 64 back into their respective retracted positions. Such a bias force will therefore in turn be in a direction causing the separation distance between the clamp arms 30, 32 to be decreased thereby allowing the springs 62d, 64d to exert a clamping force through the clamp arms 30, 32 and onto the opposed lateral regions of an individual 12 when seated.

Thus, whereas the embodiment of the lap-supported device 10 depicted in FIGS. 1-8 included clamp arms 30, 32 having a fixed dimension therebetween when in the extended state, the embodiment of the lap table 60 depicted in FIGS. 11 and 12 provide for lateral extensibility so that the dimension between the clamp arms 30, 32 can be varied as may be needed between greater and lesser extents to accommodate the laps of different size individuals.

In addition, as described above, the springs 62c, 64c will themselves exert a bias force indirectly on the clamp arms 30, 32 by virtue of the attachment of the clamp arms 30, 32 to the slide rails 62, 64, respectively. As such, the springs 62c, 64c will additionally cause the clamp arms 30, 32 to exert a clamping force onto a user's lateral thigh regions during use. Because of the clamping force that may be exerted by the clamp arms 30, 32 by virtue of the tension springs 62c, 64c, the spring-biased hinge mechanisms 34, 36 associated with the clamp arms 30, 32, respectively, are not necessarily required. Thus, according to such an alternative embodiment, the clamp arms 30, 32 may be rigidly fixed to the slide plates 62, 64 or alternatively may be pivotally moved without a separate biasing mechanism from their retracted position to an extended position thereof as such features would promote compact storage.

Accompanying FIGS. 14-19 depict another embodiment of a lap-supported device 100 in accordance with the invention which is similar to the embodiment of the device 60 described above. The embodiment of the lap-supported device 100 as shown in FIGS. 14-21 includes a positional restraint assembly 102 (see FIGS. 18 and 21) attached to a base member 104 in the form of a tray. As noted above, however, the tray base member 104 may be provided in other useful forms.

The positional restraint assembly 102 is generally comprised of an opposed pair of clamp arms 130, 132 which are shown in solid line as being in a deployed position. According to the depicted embodiment, the clamp arms 130, 132 are connected operably to a respective opposed slide plate 162, 164 to allow for pivotal movement between stowed positions (noted by the dashed line representation thereof in FIG. 15) to the deployed position as shown. More specifically, hinge pins 138, 140 are interconnect the clamp arms 130, 132 to its respective slide plate 162, 164 so as to permit reciprocal pivotal movements in the direction of arrows A4 shown in FIG. 15.

Each of the hinge pins 138, 140 coaxially carries a respective pair of torsion hinge springs 142, 144. Each torsion spring has one end engaged within a retaining pocket 162a, 164a of the slide members 162, 164 and an opposite end engaged within a receiving channel 180, 182 formed in the clamp arms 130, 132, respectively. The hinge springs 142, 144 thereby exert a bias force against the clamp arms 130, 132 which in turn pivotally biases each arm 130, 132 into a retracted state whereby the arms 130, 132 are maintained in a position whereby they are folded against and positioned adjacent to the bottom surface 104b of the tray base member 104. The hinge mechanisms 138, 140 therefore allow each the clamp arms 130, 132 to be pivotally spread against the bias force of the hinge springs 142, 144 in the direction of arrows A4, respectively, from their retracted state and into an extended state thereof whereby the clamp arms 130, 132 extend downwardly and outwardly from the tray base member 104.

Elongated hand holes 130a, 132a may be formed in each of the clamp arms 130, 132, respectively, to facility an individual applying a spreading force thereto against the bias force of the hinge springs 142, 144. The clamp arms 130, 132 may also be somewhat convexly curved so as to generally conform to the convex curvature of the lateral thigh regions of the individual when the device 100 is placed in use (e.g., as shown in FIG. 1).

The opposed slide plates 162, 164 have respective lateral edges that are cooperatively received by a parallel set of slide rails 166, 168 fixed to the bottom surface 104b of the tray base member 104 so as to permit reciprocal sliding movement of each of the slide plates 162, 164 (arrow A5 in FIG. 17) between retracted and extended positions. In such a manner, therefore, the distance between the clamp arms 130, 132 may be varied between lesser and greater extents, respectively, so as to accommodate different user needs and/or physiques.

The slide plates 162, 164 are provided with respective opposed U-shaped channels 163a, 163b having upright posts 165a, 165b to which a respective end 167a, 167b of a tension spring 167 extending therebetween is attached. The U-shaped channels 163a, 163b may be covered by arcuate cover members 171a, 171b (see FIG. 19) so as to conceal the posts 165a, 165b and the tension spring ends 167a, 167b attached thereto.

In use, slidably moving either or both of the slide plates 162, 164 from a retracted position to an extended position will responsively cause the tension spring 167 to be loaded with a biasing force that will tend to reciprocally pull the plates 162, 164 back into their respective retracted positions. Such a bias force will therefore in turn be in a direction causing the separation distance between the clamp arms 130, 132 to be decreased thereby allowing the spring 167 to exert a clamping force through the clamp arms 130, 312 and onto the opposed lateral regions of an individual when seated.

It will therefore be understood that the description provided herein is presently considered to be the most practical and preferred embodiment of the invention. Thus, the invention is not to be limited to the disclosed embodiment, but on the contrary, is intended to cover various modifications and equivalent arrangements included within the spirit and scope thereof.

What is claimed is:
1. A lap-supported device comprising:
a base member adapted to being supported by an individual's lap region;
an opposed pair of clamp arms extending outwardly from a bottom surface of the base member and spaced apart from one another so as to accommodate therebetween the lap region of the individual such that the clamp arms are adjacently positioned against respective lateral thigh regions of the individual;
a pair of opposed slide plates connected to the base member for reciprocal sliding movements between retracted and extended positions thereof, and
a biasing assembly which exerts a bias force to the clamp arms to move the clamp arms in a direction to provide a clamping force against the respective lateral thigh regions of the individual and thereby positionally restrain the base member on the individual's lap region, wherein the clamp arms are connected to a respective one of the slide plates such that the bias force of the tension spring assembly causes the clamp arms to be moved in a direction towards one another to define greater and lesser separation distances therebetween, and wherein the biasing assembly comprises a tension spring assembly which biases the clamp arms toward one another in a direction toward establishing the lesser separation distance therebetween, the tension spring assembly operatively connecting the slide plates for exerting a bias force to move the slide plates in a direction toward the retracted position thereof whereby a clamping force is exerted against the respective lateral thigh region of the individual.

2. The assembly as in claim 1, wherein each of the clamp arms is pivotally connected to the base member so as to be capable of pivotal movements between a retracted state whereby the clamp arms are positioned adjacent to the base member and an extended state whereby the clamp arms extend outwardly from the base member.

3. The lap-supported device as in claim 2, wherein the biasing assembly comprises torosional hinge springs operatively connected to the clamp arms to exert a bias force to move the clamp arms in a direction toward the retracted state thereof.

4. The lap-supported device as in claim 1, which further comprises a pair of hinge mechanisms pivotally connecting each of the clamp arms to a respective lateral side region of the base member.

5. The lap-supported device as in claim 4, wherein the hinge mechanisms include spaced-apart pairs of apertured flanges fixed to the base member, spaced apart apertured posts fixed to each of the clamp arms and coaxially aligned with the flanges, and a hinge pin joining the coaxially aligned apertured flanges and posts.

6. The lap-supported device as in claim 5, wherein the biasing spring comprises a torosional hinge spring which is coaxially carried by the hinge pin.

7. The lap-supported device as in claim 6, wherein the top surface of the base member is recessed so as to define a perimetrical lip.

8. The lap-supported device as in claim 6, wherein the base member is in the form of a tray.

9. The lap-supported device as in claim 1, wherein the tension spring assembly comprises a tension spring operatively interconnecting the opposed slide plates.

10. The lap-supported device as in claim 9, wherein each of the slide plates includes a U-shaped channel to accommodate respective ends of the tension spring.

11. The lap-supported device as in claim 10, wherein the slide plates include an upright post, and wherein the respective ends of the tension spring are connected to the upright posts of the slide plates.

12. The lap-supported device as in claim 11, wherein the slide plates comprise a cover member covering the U-shaped channel and the upright post.

13. The lap-supported device as in claim 10, wherein the base member includes an upright post, and wherein the tension spring assembly includes a pair of tension springs interconnecting the upright post of the base member and a respective one of the slide plates.

14. The lap-supported device as in claim 1, wherein the base member comprises a pair of parallel slide rails for receiving a respective edge of the slide plates to allow for reciprocal sliding movements thereof.

15. The lap-supported device as in claim 14, wherein the slide plates include a projecting boss which abuts against a respective end of the slide rails to establish the retracted position of the slide plates.

16. The lap-supported device as in claim 14, further comprising a cover member for covering the tension spring assembly.

17. The lap-supported device as in claim 1, wherein each of the clamp arms is convexly curved so as to generally conform to the respective lateral thigh region of the individual.

18. The lap-supported device as in claim 1, wherein the base member defines a substantially planar top surface.

19. A lap-supported device comprising:
a base member adapted to being supported by an individual's lap region;
an opposed pair of clamp arms extending outwardly from a bottom surface of the base member and spaced apart from one another so as to accommodate therebetween the lap region of the individual such that the clamp arms are adjacently positioned against respective lateral thigh regions of the individual;
a pair of opposed slide plates;
a pair of separated slide rails for connecting the opposed slide plates to the base member for reciprocal sliding movements between retracted and extended positions thereof; and
a biasing assembly which exerts a bias force to the clamp arms to move the clamp arms in a direction to provide a clamping force against the respective lateral thigh regions of the individual and thereby positionally restrain the base member on the individual's lap region, wherein
the clamp arms are laterally moveable relative to one another to define greater and lesser separation distances therebetween, and wherein the biasing assembly comprises a tension spring assembly which biases the clamp arms toward one another in a direction toward establishing the lesser separation distance therebetween, whereby a clamping force is exerted against the respective lateral thigh region of the individual, and wherein
the device further comprises a cover member for covering the tension spring assembly, the cover member including connection flanges for removably connecting the cover member to a respective one of the slide rails.

20. A lap-supported device comprising:
a base member adapted to being supported by an individual's lap region;
an opposed pair of clamp arms extending outwardly from a bottom surface of the base member and spaced apart from one another so as to accommodate therebetween the lap region of the individual such that the clamp arms are adjacently positioned against respective lateral thigh regions of the individual;
a pair of opposed slide plates connected to the base member for reciprocal sliding movements between retracted and extended positions thereof and
a biasing assembly which exerts a bias force to the clamp arms to move the clamp arms in a direction to provide a clamping force against the respective lateral thigh regions of the individual and thereby positionally restrain the base member on the individual's lap region, wherein the clamp arms are laterally moveable relative to one another to define greater and lesser separation distances therebetween, and wherein the biasing assembly comprises a tension spring assembly which biases the clamp arms toward one another in a direction toward establishing the lesser separation distance therebetween, whereby a clamping force is exerted against the respective lateral thigh region of the individual, and wherein each of the clamp arms is pivotally connected to a respective one of the slide plates so as to be capable of pivotal movements between a retracted state whereby the clamp arms are positioned adjacent to the base member and an extended state whereby the clamp arms extend outwardly from the base member.

21. The lap-supported device as in claim 20, wherein the biasing assembly comprises torosional hinge springs operatively connected to the clamp arms to exert a bias force to move the clamp arms in a direction of the retracted state thereof.

22. The lap-supported device as in claim 20, which further comprises hinge mechanisms which pivotally connect each of the clamp arms to a respective one of the slide plates.

23. The lap-supported device as in claim 22, wherein the hinge mechanisms include spaced-apart pairs of apertured flanges fixed to the base member, spaced apart apertured posts fixed to each of the clamp arms and coaxially aligned with the flanges, and a hinge pin joining the coaxially aligned apertured flanges and posts.

24. The lap-supported device as in claim 20, wherein the hinge mechanisms include a hinge pin, and wherein biasing assembly comprises a torsional hinge spring which is coaxially carried by the hinge pin.

25. The lap-supported device as in claim 24, wherein the slide plates include a retaining pocket and the clamp arms include a receiving channel, and wherein the torsional hinge spring has one end engaged within a receiving channel of a respective slide plate and an opposite end engaged with a receiving channel of a respective clamp arm.

26. The lap-supported device as in claim 20, wherein each of the clamp arms includes an elongate hand hole.

27. A lap-supported device comprising:
a base member;
a pair of opposed slide plates connected to the base member for reciprocal sliding movements between retracted and extended positions thereof;
a pair of clamp arms extending outwardly from the base member and connected to a respective one of the slide plates so as to be carried by the slide plates during movements between the retracted and extended positions thereof; and
a tension spring assembly which operatively connects the slide plates for exerting a bias force to move the slide plates in a direction toward the retracted position thereof so that the clamp arms are moved toward one another in a direction that establishes a lesser separation distance therebetween and thereby exert a clamping force against a respective lateral thigh region of the individual, wherein
each of the clamp arms is pivotally connected to a respective one of the slide plates so as to be capable of pivotal movements between a retracted state whereby the clamp arms are positioned adjacent to the base member and an extended state whereby the clamp arms extend outwardly from the base member, and wherein the device further comprises a biasing assembly to urge the clamp arms into the retracted state thereof.

28. The lap-supported device as in claim 27, wherein the biasing assembly comprises torsional hinge springs operatively connected to the clamp arms to exert a bias force to move the clamp arms in a direction of the retracted state thereof.

29. The lap-supported device as in claim 28, which further comprises hinge mechanisms which pivotally connect each of the clamp arms to a respective one of the slide plates.

30. The lap-supported device as in claim 29, wherein the hinge mechanisms include spaced-apart pairs of apertured flanges fixed to the base member, spaced apart apertured posts fixed to each of the clamp arms and coaxially aligned with the flanges, and a hinge pin joining the coaxially aligned apertured flanges and posts.

31. The lap-supported device as in claim 29, wherein the hinge mechanisms include a hinge pin, and wherein biasing assembly comprises a torsional hinge spring which is coaxially carried by the hinge pin.

32. The lap-supported device as in claim 31, wherein the slide plates include a retaining pocket and the clamp arms include a receiving channel, and wherein the torsional hinge spring has one end engaged within a receiving channel of a respective slide plate and an opposite end engaged with a receiving channel of a respective clamp arm.

33. The lap-supported device as in claim 27, wherein the slide plates include a pair of slide rails and a projecting boss which abuts against a respective end of the slide rails to establish the retracted position of the slide plates.

34. A lap-supported device comprising:
a base member;
a pair of opposed slide plates connected to the base member for reciprocal sliding movements between retracted and extended positions thereof;
a pair of clamp arms extending outwardly from the base member and connected to a respective one of the slide plates so as to be carried by the slide plates during movements between the retracted and extended positions thereof; and
a tension spring assembly which operatively connects the slide plates for exerting a bias force to move the slide plates in a direction toward the retracted position thereof so that the clamp arms are moved toward one another in a direction that establishes a lesser separation distance therebetween and thereby exert a clamping force against a respective lateral thigh region of the individual, wherein the tension spring assembly comprises a tension spring operatively interconnecting the opposed slide plates.

35. The lap-supported device as in claim 34, wherein each of the slide plates includes a U-shaped channel to accommodate respective ends of the tension spring.

36. The lap-supported device as in claim 35, wherein the slide plates include an upright post, and wherein the respective ends of the tension spring are connected to the upright posts of the slide plates.

37. The lap-supported device as in claim 36, wherein the slide plates comprise a cover member covering the U-shaped channel and the upright post.

38. The lap-supported device as in claim 27, wherein the base member includes an upright post, and wherein the tension spring assembly includes a pair of tension springs interconnecting the upright post of the base member and a respective one of the slide plates.

39. The lap-supported device as in claim 27, further comprising a cover member for covering the tension spring assembly.

* * * * *